March 2, 1937. H. W. LEVERENZ 2,072,115
LUMINESCENT SCREEN
Filed Aug. 30, 1932
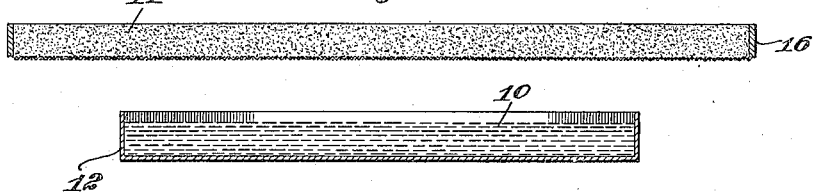
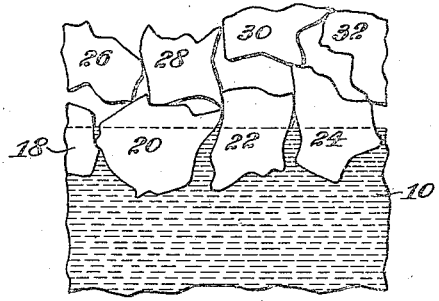
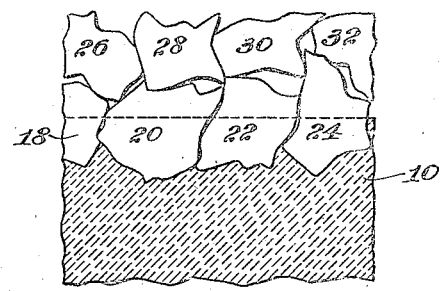
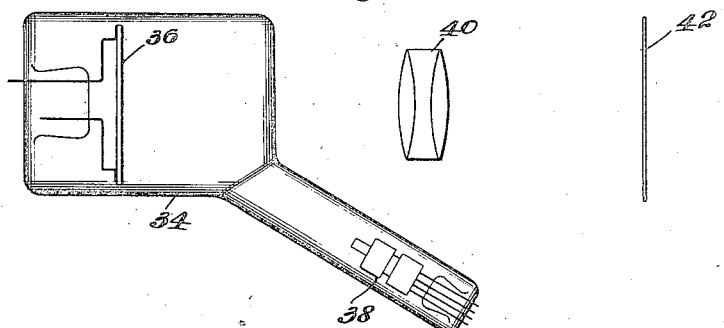
INVENTOR:
Humboldt W. Leverenz,
BY T R Goldsborough
HIS ATTORNEY.

Patented Mar. 2, 1937

2,072,115

UNITED STATES PATENT OFFICE 2,072,115

LUMINESCENT SCREEN

Humboldt W. Leverenz, Collingswood, N. J., assignor to Radio Corporation of America, New York, N. Y., a corporation of Delaware Application August 30, 1932, Serial No. 631,028

4 Claims. (Cl. 250—34)

My invention relates to improvements in luminescent screens, and more particularly to screen structure of the type adapted for use in cathode ray tubes.

One of the objects of my invention is to provide an improved method of making screens of the character referred to whereby screen structure may be provided which has advantages over the various screen structures proposed heretofore, in the way of stability and strength.

Other objects and advantages will hereinafter appear.

In accordance with my invention, I provide a screen having a vitreous or glassy carrier element one surface of which carries a layer of luminescent material. Preferably, the carrier element is formed by fusing one or more compounds of the lighter elements, such as boron trioxide or the like, which melt at a temperature below the decomposition point of the luminescent material. Particles of a luminescent or other material to form the screen are then allowed to settle upon the surface of the liquid base to form a layer perhaps several particles in thickness. The combination is then allowed to cool, during which time the supporting base element contracts to move the lowermost particles more closely together. This action apparently causes the sharp edges of the lowermost particles to interlock with the sharp edges of the particles in the next layer or strata. After the cooling step, the lowermost particles are firmly embedded in the base or supporting member.

My invention resides in the improved method of the character hereinafter described and claimed and in the screen structure provided thereby.

In the drawing, Figure 1 is an elevational, sectional view, illustrating one step in my improved method;

Figs. 2 and 3 are enlarged, fragmentary, sectional views, illustrative of the action which takes place during the making of screen structure in accordance with my invention; and Fig. 4 is a simplified, elevational view, illustrative of the manner in which it is proposed to use the screen structure in a cathode ray tube.

With reference to Fig. 1, a suitable substance 10, composed of compounds of the lighter elements, lying below phosphorus in atomic weight, in the periodic system, such as boron trioxide, is placed in a shallow pan 12 and heated to a temperature whereat it will flow freely. Another satisfactory material for the purpose is a beryllium glass having the composition $B_2O_3$—80, $Li_2O$—10 and $BeO$—10%. This glass has a melting point in the neighborhood of 900 degrees centigrade.

Assuming that the screen structure is to be embodied in a cathode ray tube for television reception, a suitable luminescent material 14 which does not decompose at the melting point of the particular glass employed, for example, zinc sulphide phosphor, in powder form, is next placed in a fine mesh sieve 16. As shown in the figure, the material fills the screen, and is leveled off, so that there is the same pressure on each of the lowermost particles at each of the openings of the sieve. The sieve is then tapped sharply to cause some of the particles to float down and settle upon the surface of the liquid material 10. In this step, sufficient material is allowed to settle to form a layer of the luminescent material apparently about two or three grains or particles in thickness, uniformly over the entire area. The layer of the luminescent material may be applied to the surface of the liquid element 10 in any other suitable manner, such as by spraying, or by forming a cloud of the fluorescent particles over the pan 12 and allowing settlement to take place until the desired layer has been applied.

Fig. 2 is illustrative of my present understanding of the physical condition when a layer of the luminescent material, two particles in thickness, is allowed to settle upon the surface of the liquid material 10. The lowermost particles 18, 20, 22 and 24 undoubtedly sink into the liquid 10 a substantial amount, and the uppermost particles 26, 28, 30 and 32 rest on the lowermost particles in some such manner as is shown.

The combination is then allowed to cool, whereupon the liquid material 10, which is to form the supporting base member of the screen structure, contracts to move the embedded particles 18 to 24 close together in interlocked relation, as illustrated in Fig. 3. During this action, there also seems to be a re-arrangement of the upper particles in such manner that the sharp edges or corners of the latter become interlocked with those of the lower particles, as shown. In this manner, the luminescent material is very firmly locked to the supporting base member 10, to form a very tough and stable luminescent screen of substantially uniform thickness over the entire area.

In Fig. 4, screen structure made in accordance with my improved method is shown as supported in a cathode ray tube 34 for television reception, the screen structure being so disposed within the tube that the layer 36 of luminescent material may be subjected to direct bombardment by the cathode ray emitted from the usual gun 38. The television picture reproduced on the screen structure is projected by a suitable lens system 40 onto a suitable screen 42.

When so used in a cathode ray tube, it is my present understanding that X-rays and ultra-violet rays are evolved from the upper particles of the layer, under the action of the cathode ray. Were the carrier composed of a glass of one or more of the heavier elements, such as lead, the X-rays and ultra-violet rays would be absorbed to a great extent before reaching the embedded particles, thus reducing the amount of light emitted. The lighter elements, however, which I prefer to utilize, give rise to glasses that are sufficiently transparent to the X-rays and ultra-violet rays to reduce absorption to a negligible amount.

It will, of course, be appreciated, however, that in certain instances the non-penetration of the X-rays is desirable, particularly if the screen is to be transparent, in order that harm to the observer may be obviated. In such event, I may, without departing from the spirit of my invention, include in the vitreous carrier, either as a separate layer or integrally therewith a definite amount of lead-glass, or the like, which is opaque to X-rays.

From the foregoing, it will be seen that I have provided an improved method for so applying particles of luminescent or other material to a supporting base member that the particles cannot be shaken off. Furthermore, when the screen structure is used in a cathode ray tube, there is an advantage in the way of better heat conductivity away from the luminescent material through the supporting base member 10. Also, some of the luminescent materials, such as the alkali halides, also appear to become more brilliant, upon cathode ray bombardment, due to the increased pressure on the particles caused by the contraction of the base member in making the screen structure.

I claim as my invention:

1. In the art of making a luminescent screen structure comprising a supporting base member and a substantially uniform layer of luminescent material applied thereto, the method which comprises heating the material of the base member to melt said material below the melting temperature of the luminescent material, then depositing particles of said first-named material on and substantially uniformly over the surface of the liquefied base material, and then allowing such combination to cool.

2. Screen structure of the character described comprising a shallow pan, a uniform layer of a vitreous material disposed in said pan, and a uniform layer of a luminescent material disposed on the surface of said first-named layer, the adjacent faces of said layers being interlocked.

3. Luminescent screen structure comprising a base member of vitreous material having a flat surface, and particles of a luminescent material disposed substantially uniformly over the flat surface of said member and interlocked in the vitreous material, the melting temperature of said vitreous material being below the melting temperature of the luminescent material.

4. Luminescent screen structure comprising a base member of boron trioxide, having a flat surface and particles of a luminescent material disposed substantially uniformly over the flat surface of said member, and interlocked in the boron trioxide member, the melting temperature of said boron trioxide being below that of the melting temperature of the luminescent material.

HUMBOLDT W. LEVERENZ.